RESISTANCE DIALING RECEIVER

Filed March 27, 1967

GERRIT H.VAN HENSBERGER
HENRI P.J GRUBBEN
JAN H.H.LIMBURG
BY
Frank R. Trifari
AGENT

3,476,881
RESISTANCE DIALING RECEIVER

Gerrit Hendrik van Hensbergen and Henri Peter Johannes Grubben Hilversum, Netherlands, assignors, by mesne assignments, to U.S. Philips Corporation, New York, N.Y., a corporation of Delaware Filed Mar. 27, 1967, Ser. No. 626,045
Claims priority, application Netherlands, Mar. 26, 1966, 6604015
Int. Cl. H04m 3/18
U.S. Cl. 179—16 5 Claims

ABSTRACT OF THE DISCLOSURE

In a signalling device of the type in which the resistance of resistors selected in one station is determined at another station, the resistance of interconnecting lines between the stations can interfere with the proper determination of the selected resistors. The disclosure describes an automatic signalling system of the above type in which a capacitor is charged to a voltage corresponding to the line voltage drop prior to the testing of the signalling resistors, and this voltage is subtracted from the voltage applied to a plurality of threshold devices during the testing of the signalling resistors.

The invention relates to a device for discriminating resistors of different, predetermined values, connected between the wires of a signalling line for transmitting selection and other information items, which signalling line is connected at the receiver end to a direct-voltage source.

Such a device is employed in automatic telephone systems, in which at the subscriber station the digits are selected by consecutive depression of selecting buttons, the pushbuttons actuating selecting contacts which connect the associated selecting resistors between the wires of the subscriber line. In practice this mode of transmission of selection information is sometimes termed "direct-current push-button selection" in contrast to methods in which tone-frequency signals are transmitted. The line voltage at the receiver end of the subscriber line is, for each particular selecting resistor, a function of the loop resistance. The difficulty is involved that great differences may occur between the loop resistances of the various subscriber lines. Normally only two line conditions are distinguished, that is to say the open and the closed loop conditions. In practice it appears that with a variation of the loop resistance between 0 and 1400 ohms it is possible without particular expedients to distinguish two further conditions, which correspond to two selecting resistors of different values. A further increase in the number of selecting resistors provides, in accordance with the loop resistance, an overlapping of the line voltages associated with the various selecting resistors.

The invention has for its object to provide a new mode of compensating for the influence of the loop resistance.

The device according to the invention is characterized in that there are provided a storage device for storing the line voltage occurring in the closed state of the signalling line at its receiver end and a voltage divider connected to said storage device for dividing the stored line voltage by different factors and a subtracting device for producing difference voltages between the line voltage appearing after a selecting resistor is switched on and the partial voltages derived from the voltage divider, and threshold devices connected to the subtracting device for comparing the difference voltages with predetermined threshold voltages.

Figure 1:
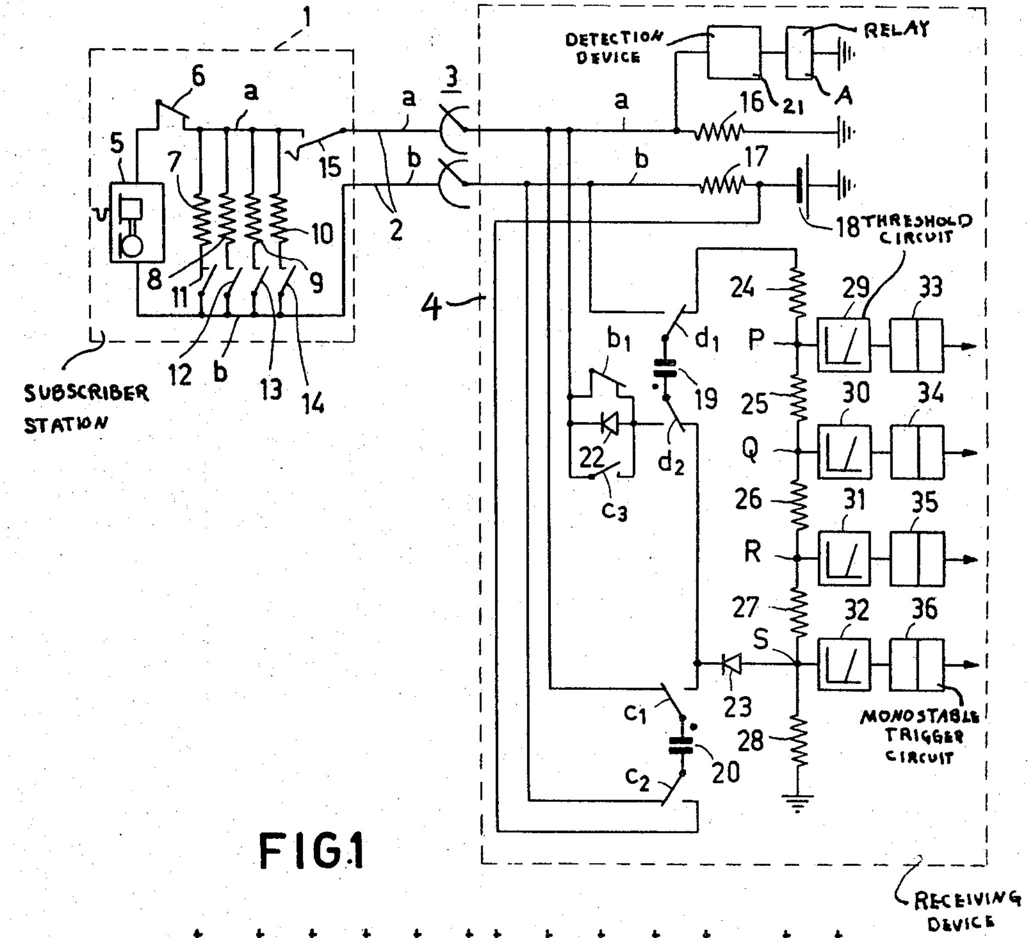
Figure 2:
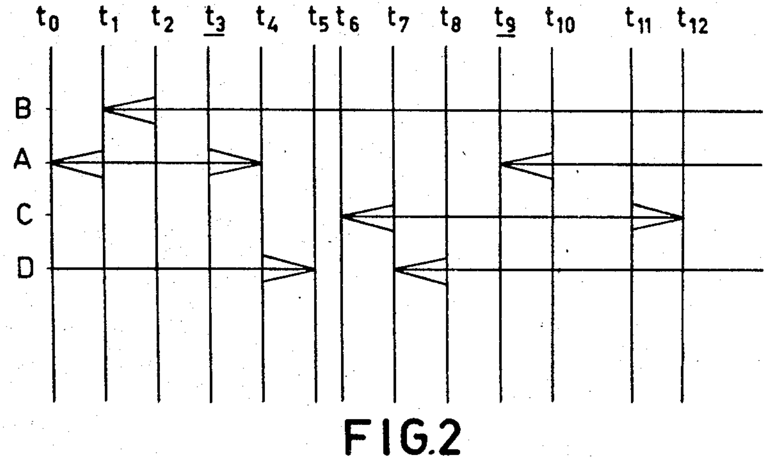

The invention will be described more fully with reference to the figures:

FIG. 1 shows an embodiment of a receiving device according to the invention, to which a subscriber station is linked and FIG. 2 shows a relay diagram for explaining the operation of the receiving device shown in FIG. 1.

FIG. 1 shows a subscriber station 1 of an automatic telephone system, which station is linked through a subscriber line 2 and a selecting stage 3 to a receiving device 4. The subscriber station and the receiving device are illustrated in a drastically simplified form, whilst all elements not essential for a good understanding of the invention are omitted. The subscriber station comprises a subscriber set 5, which is connected through a break contact 6 between the *a*- and *b*-cores of the subscriber station. The subscriber station comprises furthermore four selecting resistors 7, 8, 9 and 10, each of which is connected in series with a selecting contact 11, 12, 13, 14 between the *a*- and *b*-cores of the subscriber station. The subscriber station comprises furthermore a switch hook 15, which is closed upon a call. When a selecting contact is closed, the break contact 6 opens simultaneously and disconnects the subscriber set 5 from the subscriber line. The selecting resistors may have the values 560, 1300, 2700 and 7500 ohms. In practice the two current directions are used for transmitting selection information. The subscriber station comprises in this case two groups of selecting resistors relatively discoupled by rectifiers. By combining a selecting resistor of one group with a selecting resistor of the other group a great number of different signs can be signalled.

In the receiver device 4 the *a*-core is connected through a resistor 16 to earth. The *b*-core is connected through a resistor 17 to the negative terminal of the central battery 18, the positive terminal of which is earthed. In the receiver device the line voltage appearing before a selecting contact is closed is utilized for compensating the influence of the loop resistance. This voltage, thereinafter termed the compensation voltage, is stored in a capacitor 19. The line voltage occurring after the closure of a selecting contact, hereinafter termed the measuring voltage, is stored in a capacitor 20. When a subscriber station in the calling state is connected to the receiving device, a detection device 21, connected to the resistor 16, responds. After this response the detection device 21 energizes the relay A, which controls all switching operations of the receiver. For carrying out the switching operations the receiver comprises relays B, C and D (not shown), whose contacts *b*, *c* and *d* are shown partly in FIG. 1. The switching operations are performed in accordance with the diagram of conditions illustrated in FIG. 2. In this diagram the instants of starting or terminating of a change of state are indicated by $t_0$, $t_1$ . . . It should be noted here that, in general, these instants need not be spaced apart by equal intervals. The instant $t_0$ is the instant of switching-on of the subscriber station. The instant $t_3$ is the instant of closing of a selecting contact and the instant $t_9$ is the instant of opening of the selecting contact. At the instant $t_0$ the relay D is energized and the capacitor 19 is connected via the changeover contacts $d_1$ and $d_2$ (make-side) and the break contact *b* in series between the *a*- and *b*-cores of the subscriber line. The time interval from $t_0$ to $t_1$ is the rise time of relay A. After the relay A is energized the relay B is energized. The time interval from $t_1$ to $t_2$ is the rise time of relay B. The relay B serves for monitoring the communication and is held further. At the instant $t_2$ the break contact *b* opens, so that the rectifier 22, connected in parallel with contact *b*, is connected between the capacitor 19 and the subscriber line. At the instant $t_3$ a selecting contact is closed. When a selecting contact is closed, a selecting resistor of the subscriber station is connected between the *a*- and the *b*-cores. This resistor has a higher value than the direct-current resistance of the subscriber set 5, which usually amounts from 75 to 200 ohms. In the receiver the line voltage increases and the current through the resistor 16 decreases. The increasing line voltage blocks the rectifier 22 and thus disconnects the capacitor 19 from the subscriber line. The current decrease across the resistor 16 terminates the energization of the relay A by means of the detection device 21. The time interval $t_3$ to $t_4$ corresponds to the releasing time of relay A. After the deenergization of the relay A, relay D is also deenergized. The time interval $t_4$ to $t_5$ corresponds to the release time of relay D. At the instant $t_5$ the change-over contacts $d_1$ and $d_2$ (break side) connect the capacitor 19 in series with the rectifier 23 in parallel with the series combination of the resistors 24, 25, 26 and 27. The voltage of the capacitor 19 cuts off the rectifier 23, so that the capacitor 19 preserves its voltage. The capacitor 20 is connected from the instant $t_0$ across the change-over contacts $c_1$ and $c_2$ (break side) between the *a*- and *b*-cores of the subscriber line. After a given delay time subsequent to the release of relay A, the relay C is energized. The time interval $t_4$ to $t_6$ corresponds to the delay time and the time interval $t_6$ to $t_7$ corresponds to the rise time of relay C. This delay time serves for causing the switching-on phenomenon appearing after the closure of a selecting contact to die out before the relay C is energized. This delay time may be obtained by means of a follow-up relay of relay A. At the instant $t_7$ the change-over contacts $c_1$ and $c_2$ (break side) connect the capacitor 20 from the subscriber line. The change-over contacts $c_1$ and $c_2$ (make side) complete the following current circuit: earth, resistor 28, rectifier 23, change-over contact $c_1$ (make side), capacitor 20, change-over contact $c_2$ (make side), negative terminal of battery 18. The voltage of the capacitor 20 and that of the battery 18 in series release the rectifier 23, which then connects the capacitor 19 in parallel with the series combination of the resistors 24, 25, 26 and 27. At the junctions P, Q, R and S between the resistors 24–25, 25–26, 26–27, 27–28 there are provided threshold circuits 29, 30, 31 and 32 respectively, which are individually joined to said junctions. To each threshold circuit is connected a monostable trigger circuit 33, 34, 35 and 36 respectively. When the voltage of a junction exceeds, in an absolute sense, the threshold voltage of the associated threshold circuit, the latter sets the trigger connected thereto in the *a*-stable state. Each trigger in the a-stable state returns automatically to the stable state and thus produces an output pulse. At the instant $t_7$ one or more of the triggers 33, 34, 35 and 36 is (are) set in the a-stable state. After the relay C is energized, the relay D is energized. The time intervals $t_7$ to $t_8$ corresponds to the rise time of relay D. At the instant $t_8$ the change-over contacts $d_1$ and $d_2$ (break side) connect the capacitor 19 between the *a*- and *b*-cores of the subscriber line. The rectifier 22 is shunted by the make contact $c_3$, which is still closed. At the instant $t_9$ the selecting contact is opened. In the subscriber station opening of the selecting contact disconnects the selecting resistor and connects the subscriber set 5 through the break contact 6 into the circuit. In the receiver the line voltage decreases and the current through the resistor 16 increases. The current increase through the resistor 16 causes the detection device 16 to respond, which energizes the relay A. The time interval $t_9$ to $t_{10}$ corresponds to the rise time of relay A. A given time lag after the energization of relay A the relay C is de-energized. The time interval $t_{10}$ to $t_{11}$ corresponds to the time lag and the time interval $t_{11}$ to $t_{12}$ corresponds to the release time of relay C. This time lag serves for causing the switching-on phenomenon appearing after the opening of the selecting contact to die out before relay C is de-energized. At the instant $t_{12}$ the make contact $c_3$ is opened so that the rectifier 22 is connected between the capacitor 19 and the subscriber line. The change-over contacts $c_1$ and $c_2$ (break side) connect the capacitor 20 between the *a*- and *b*-cores of the subscriber line. The receiver is then ready for the reception of the next-following signal.

After the energization of relay C at the instant $t_7$ a compensation voltage of $-Vc$ volts is operative across the series combination of the resistors 24, 25, 26 and 27 and the sum of a measuring voltage of $+Vm$ volts and of the battery voltage of $-E$ volts is operative across the resistor 28. In FIG. 1 the positive sides of the capacitors 19 and 20 are marked by a black dot. The compensation voltage is divided among the resistors 24 to 27 in accordance with their ratio. The junctions P, Q, R and S obtain each a fraction of the compensation voltage. This fraction is indicated by a factor $C_p$, $C_q$, $C_r$ and $C_s$ respectively and termed hereinafter the compensation factor, wherein $C_p$ is greater than $C_q$, $C_q$ is greater than $C_r$ and $C_r$ is greater than $C_s$. The voltage at each junction P, Q, R and S to earth, that is to say $-Vp$, $-Vq$, $-Vr$ and $-Vs$ volts respectively, is composed of the algebraic sum of the relevant fraction of the compensation voltage and the voltage across the resistor 28. In a formula it applies that $$-Vp=-C_p \cdot Vc+VM-E$$
$$-Vq=-C_q \cdot Vc+Vm-E$$
$$-Vr=-C_r \cdot Vc+Vm-E$$
$$-Vs=-C_s \cdot Vc+Vm-E$$

The compensation factors or the ratio between the resistors 24 to 27 are chosen definitely. The compensation factor $C_p$ is chosen so that $Vp$ across a selecting resistor of 560 ohms has the same value at a loop resistance of the subscriber line of 0 ohm and at a loop resistance of 1400 ohms. The value of $Vp$ at which this applies is represented by $Vp$ (560). In a similar manner the compensation factors $C_q$, $C_r$, $C_s$ are determined so that $Vq$, $Vr$, $Vs$ across selecting resistors of 1300, 2700 and 7500 ohms respectively have the same values at a loop resistor of 0 ohms and at a loop resistance of 1400 ohms. The value of $Vq$, $Vr$, $Vs$ at which this applies is indicated by $Vq$ (1300), $Vr$ (2700) and $Vs$ (7500) respectively. The value found for the factor $C_s$ is so small that in practice it may be assumed to be equal to zero. The measuring voltage varies more strongly with the loop resistance according as the selecting resistor has a lower value. This explains that according as the value of the selecting resistor is lower, a greater portion of the compensation voltage is required for compensating the variation of the measuring voltage with the loop resistance.

The threshold voltage of the threshold circuit 29 is, in the absolute sense, adjusted just below $-Vp$ (560) volts. In a similar manner the threshold voltage of the threshold circuit 30, 31, 32 is, in the absolute sense, adjusted just below $-Vq$ (1300), $-Vr$ (2700), $-Vs$ (7500) respectively. This provides the following coding. A selecting resistor of 560 ohms sets all trigger circuits 33, 34, 35 and 36 in the *a*-stable state; a selecting resistor of 1300 ohms sets the triggers 34, 35, 36 in the *a*-stable state; a selecting resistor of 2700 ohms sets the trigger circuit 35 and 36 in the *a*-stable state and a selecting resistor of 7500 ohms sets the trigger 36 in the *a*-stable state.

The voltages appearing at the junctions P, Q, R, S of the voltage divider 24–27 are now considered more closely. By way of example the junction R is taken. The voltage at the junction R for a selecting resistor of 2700 ohms is independent of the loop resistance and is assumed to be $-Vr$ (2700) volts. At junction R for a selecting resistor of 2700 ohms a complete compensation of the influence of the loop resistance is just obtained. For a selecting resistor of lower value (560 ohms, 1300 ohms) no complete compensation is obtained, whereas for a selecting resistor of a higher value (7500 ohms) over-compensation is obtained. On the basis of a loop resistance of 1400 ohms divergence appears with a decreasing loop resistance, between the voltages at the junction R for selecting resistors having a value differing from 2700 ohms and the voltages of $-Vr$ (2700) with a selecting resistor of 2700 ohms. Such divergences also appear at the other junctions. The threshold voltage of the threshold circuit 31, which is adjusted in the absolute sense just below —V*r* (2700), indicates the limit between the selecting resistors of a value exceeding 2700 ohms and the selecting resistors having a value of 2700 ohms or less. Where this limit can be indicated for a loop resistance of 1400 ohms, this limit also applies to lower values of the loop resistance owing to the aforesaid divergence. The same applies to the other junctions. It is thus accounted for that, when the receiver described is used, four different selecting resistors can be employed, which means double the number as compared with the case in which a receiver without compensation is used. The compensation of the influence of the loop resistance may, of course, also be utilized for permitting a greater variation of the loop resistance with the same number of selecting resistors. At any rate a greater variation of the loop resistance may be compensated by the relevant number of selecting resistors according as the one or the other is preferred.

The following data of a practical embodiment of the receiver may be given by way of example:

| Capacitors: | | Value |
|---|---|---|
| 19 | μf | 0.5 |
| 20 | μf | 0.5 |
| Resistors: | | |
| 16 | ohms | 390 |
| 17 | do | 390 |
| 24 | do | 6800 |
| 25 | do | 3300 |
| 26 | do | 1800 |
| 27 | do | 1500 |
| 28 | do | 620 |
| Battery 18 | volts | —48 |

| Threshold circuits: | Threshold voltages |
|---|---|
| 29 | —28.6 |
| 30 | —18.4 |
| 31 | —11.0 |
| 32 | —5.0 |

It should be noted that in the practical embodiment a resistor of 17,000 ohms is connected between the *a*- and *b*-cores of the receiver for reducing the voltage spread due to the spread of leakage resistances of the subscriber lines.

When the two current directions are used for transmitting selection information two selecting resistors decoupled by rectifiers polarized in opposite senses are connected between the *a*- and *b*-cores in the subscriber station by depressing a selecting button. After the detection of the selecting resistor connected in the normal current direction the current direction is automatically inverted and the selecting resistor switched on in the inverted current direction is detected. For each current direction a receiving device of the type described above may be employed. The detection device 21 is common to the two receivers and the capacitor 19 of the receiver for the inverted current direction is disconnected simultaneously with the capacitor 19 of the receiver for the normal current direction from the subscriber line. The capacitor 20 of the receiver for the inverted current direction is disconnected from the subscriber line a certain time lag after the instant of current inversion.

What is claimed is:

1. A device for discriminating resistors of different predetermined values, which are connected between the wires of a signalling line for the transmission of selection and other information items, and the signalling line is connected at the receiver end to a direct-voltage source, characterized in that there are provided a storage device for storing the line voltage appearing at the receiver end in the closed state of the loop of the signalling line and a voltage divider connected to said storage device for dividing the stored line voltage by different factors and a subtracting device for producing difference voltages between the line voltage appearing after a selecting resistor is switched on and the fractional voltage derived from the voltage divider and threshold devices connected to the subtracting device for comparing the difference voltages with predetermined threshold voltages.

2. A receiving device as claimed in claim 1, characterized in that the store is formed by a capacitor and in that there is provided a change-over member for changing over the capacitor from the signalling line to the voltage divider and conversely.

3. A receiver as claimed in claim 2, characterized in that the subtracting device is formed by a second capacitor, there being provided a second change-over member for changing over the second capacitor from the signalling line to a free end of the voltage divider on one side of the capacitor and a point of constant potential on the other side of the capacitor and conversely.

4. A receiver as claimed in claim 1 characterized in that to the threshold circuits are connected monostable trigger circuits, and in that, when the threshold voltage is exceeded, the relevant trigger circuit is set in the a-stable state.

5. A signalling system of the type including a first station having a first pair of terminals and means for selectively connecting a first resistor and a plurality of other different valued resistors between said first pair of terminals, a receiving station having a second pair of terminals and including means for determining the value of resistance connected between said first pair of terminals, and a pair of conductors interconnecting said first and second pairs of terminals, wherein the improvement comprises means in said receiving station for determining said value of resistance independently of the resistance of said conductors, said last mentioned means comprising first and second capacitors, a source of direct voltage, resistor means connecting said source to said second pair of terminals whereby the voltage between said second pair of terminals is dependent upon the resistance connected between said first pair of terminals, means responsive to the connection of said first resistor to said first pair of terminals for storing the resultant voltage at said second pair of terminals in said first capacitor, means responsive to the connection of one of said other resistors to said first pair of terminals for storing the resultant voltage at said second pair of terminals in said second capacitor, a plurality of threshold devices, voltage dividing means, means connecting said voltage dividing means to said first capacitor for providing a plurality of voltages that are different predetermined portions of the voltage across said first capacitor, and means for applying the difference between the voltage across said second capacitor and a different portion of the voltage across said first capacitor to each threshold device.

References Cited

UNITED STATES PATENTS 2,661,395 12/1953 Styren et al.

KATHLEEN H. CLAFFY, Primary Examiner

W. A. HELVESTINE, Assistant Examiner

U.S. Cl. X.R.

179—84

PO-1050
(5/69)

UNITED STATES PATENT OFFICE

CERTIFICATE OF CORRECTION

Patent No. 3476881 Dated November 4, 1969

Inventor(s) GERRIT H. VAN HENSBERGEN ET AL

It is certified that error appears in the above-identified patent and that said Letters Patent are hereby corrected as shown below:

column 1, line 3, after the title insert -- Jan H.H. Limburg -- column 4, line 21, "M" should read -- m --;

Signed and sealed this 7th day April 1970.

(SEAL)
Attest:

Edward M. Fletcher, Jr.
Attesting Officer

WILLIAM E. SCHUYLER, JR.
Commissioner of Patents